(12) United States Patent
Fitzpatrick et al.

(10) Patent No.: US 12,263,767 B2
(45) Date of Patent: Apr. 1, 2025

(54) OCCUPANT POSITIONER

(71) Applicant: Faurecia Automotive Seating, LLC, Auburn Hills, MI (US)

(72) Inventors: Robert C. Fitzpatrick, Auburn Hills, MI (US); Jeffery T. Bonk, Auburn Hills, MI (US)

(73) Assignee: Faurecia Automotive Seating, LLC, Auburn Hills, MI (US)

( * ) Notice: Subject to any disclaimer, the term of this patent is extended or adjusted under 35 U.S.C. 154(b) by 260 days.

(21) Appl. No.: 17/917,717

(22) PCT Filed: Apr. 21, 2020

(86) PCT No.: PCT/US2020/029133
§ 371 (c)(1),
(2) Date: Oct. 7, 2022

(87) PCT Pub. No.: WO2021/216049
PCT Pub. Date: Oct. 28, 2021

(65) Prior Publication Data
US 2023/0158926 A1    May 25, 2023

(51) Int. Cl.
*B60N 2/42* (2006.01)
*B60N 2/427* (2006.01)
*B60N 2/68* (2006.01)
*B60N 2/806* (2018.01)

(52) U.S. Cl.
CPC ....... *B60N 2/4228* (2013.01); *B60N 2/42745* (2013.01); *B60N 2/68* (2013.01); *B60N 2/806* (2018.02)

(58) Field of Classification Search
CPC .. B60N 2/4228; B60N 2/806; B60N 2/42745; B60N 2/68
See application file for complete search history.

(56) References Cited

U.S. PATENT DOCUMENTS

| 5,769,489 A | * | 6/1998 | Dellanno | ........... | B60N 2/42709 |
| | | | | | 297/216.12 |
| 6,398,299 B1 | | 6/2002 | Angerer | | |
| 7,077,472 B2 | * | 7/2006 | Steffens, Jr. | ....... | B60N 2/42781 |
| | | | | | 297/216.12 |

(Continued)

FOREIGN PATENT DOCUMENTS

| EP | 1738955 B1 | 1/2007 |
| EP | 1935710 A2 | 6/2008 |

(Continued)

OTHER PUBLICATIONS

International (PCT) Search Report and Written Opinion for PCT/US2020/29133 dated Jul. 27, 2020, IDFAUH19112 PCT II (47631-317130), 8 pages.

(Continued)

*Primary Examiner* — Philip F Gabler
(74) *Attorney, Agent, or Firm* — Barnes & Thornburg LLP (57) ABSTRACT

An occupant support includes a seat bottom and a seat back. The seat back is coupled to the seat bottom and includes a headrest and a backrest. The occupant support is configured to support an occupant resting thereon before, during, and after an impact force is applied to the occupant support.

15 Claims, 9 Drawing Sheets

(56) References Cited

U.S. PATENT DOCUMENTS

| | | | | |
|---|---|---|---|---|
| 8,678,494 B2* | 3/2014 | Nitsuma | ............... | B60N 2/4228 |
| | | | | 297/216.12 |
| 8,876,206 B2* | 11/2014 | Yamaguchi | .......... | B60N 2/7094 |
| | | | | 297/230.12 |
| 10,752,136 B2* | 8/2020 | Sugiyama | ............ | B60N 2/2222 |
| 11,117,537 B2* | 9/2021 | Bonk | ................. | B60N 2/42709 |
| 11,447,049 B2* | 9/2022 | Sekizuka | ............... | B60R 21/233 |
| 2011/0215619 A1* | 9/2011 | Kanda | .................. | B60N 2/4228 |
| | | | | 297/216.14 |
| 2012/0001462 A1 | 1/2012 | Cyoukyu | | |
| 2012/0119551 A1 | 5/2012 | Brncick | | |
| 2013/0076092 A1 | 3/2013 | Kulkarni | | |

FOREIGN PATENT DOCUMENTS

| | | |
|---|---|---|
| FR | 2946586 A1 | 12/2010 |
| KR | 20020046503 A | 6/2002 |
| KR | 20050051755 A | 6/2005 |
| KR | 20050104746 A | 11/2005 |

OTHER PUBLICATIONS

International Search Report and Written Opinion for PCT/US2020/029133 dated Jul. 27, 2020.

* cited by examiner

OCCUPANT POSITIONER

CROSS REFERENCE TO RELATED APPLICATIONS

This application is a U.S. national stage application under 35 U.S.C. § 371 (b) of International Application No. PCT/US2020/029133 filed Apr. 21, 2020, the disclosure of which is hereby expressly incorporated by reference in their entirety.

BACKGROUND

The present disclosure relates to occupant supports, and particularly to occupant supports for vehicles. More particularly, the present disclosure relates to occupant supports including an occupant positioner configured to change a position of the occupant.

SUMMARY

According to the present disclosure, an occupant support includes a seat bottom and a seat back. The seat back is coupled to the seat bottom and arranged to extend upwardly away from the seat bottom. The seat back includes a headrest located in spaced apart relation above the seat bottom and a backrest located between the headrest and the seat bottom.

In illustrative embodiments, the occupant support further includes a reactive-occupant positioner coupled to the seat back to move therewith and is configured to arrange an occupant on the occupant support in response to an impact event so that the occupant moves from (i) a pre-event arrangement in which a torso of the occupant is arranged a first distance from a frame of the seat back so that comfort is maximized prior to application of an impact force to the occupant support, (ii) to an event arrangement in which the torso of the occupant is arranged a second distance from the frame that is less than the first distance so that a head of the occupant moves toward and engages the headrest to minimize whiplash of the occupant during the impact event, and (iii) to a post-event arrangement in which the torso of the occupant is arranged a third distance from the frame that is greater than the second distance after the impact event is complete without repair of the reactive-occupant positioner.

In illustrative embodiments, in response to the impact event, the reactive-occupant positioner changes from a pre-event configuration in which the reactive-occupant positioner causes the occupant to be in the pre-event arrangement, to an event configuration in which the reactive-occupant positioner causes the occupant to be in the event arrangement.

In illustrative embodiments, the reactive-occupant positioner includes a rear platform coupled to the seat back in a fixed position relative to the seat back and a front platform movable relative to the rear platform.

In illustrative embodiments, in the pre-event configuration, the reactive-occupant positioner has a first thickness defined between the front platform and the rear platform, in the event configuration, the reactive-occupant positioner has a second thickness defined between the front platform and the rear platform that is less than the first thickness, and, in the post-event configuration, the reactive-occupant positioner has a third thickness defined between the front platform and the rear platform that is greater than the second thickness.

Additional features of the present disclosure will become apparent to those skilled in the art upon consideration of illustrative embodiments exemplifying the best mode of carrying out the disclosure as presently perceived.

BRIEF DESCRIPTIONS OF THE DRAWINGS

The detailed description particularly refers to the accompanying figures in which.

DETAILED DESCRIPTION

Figure 9:
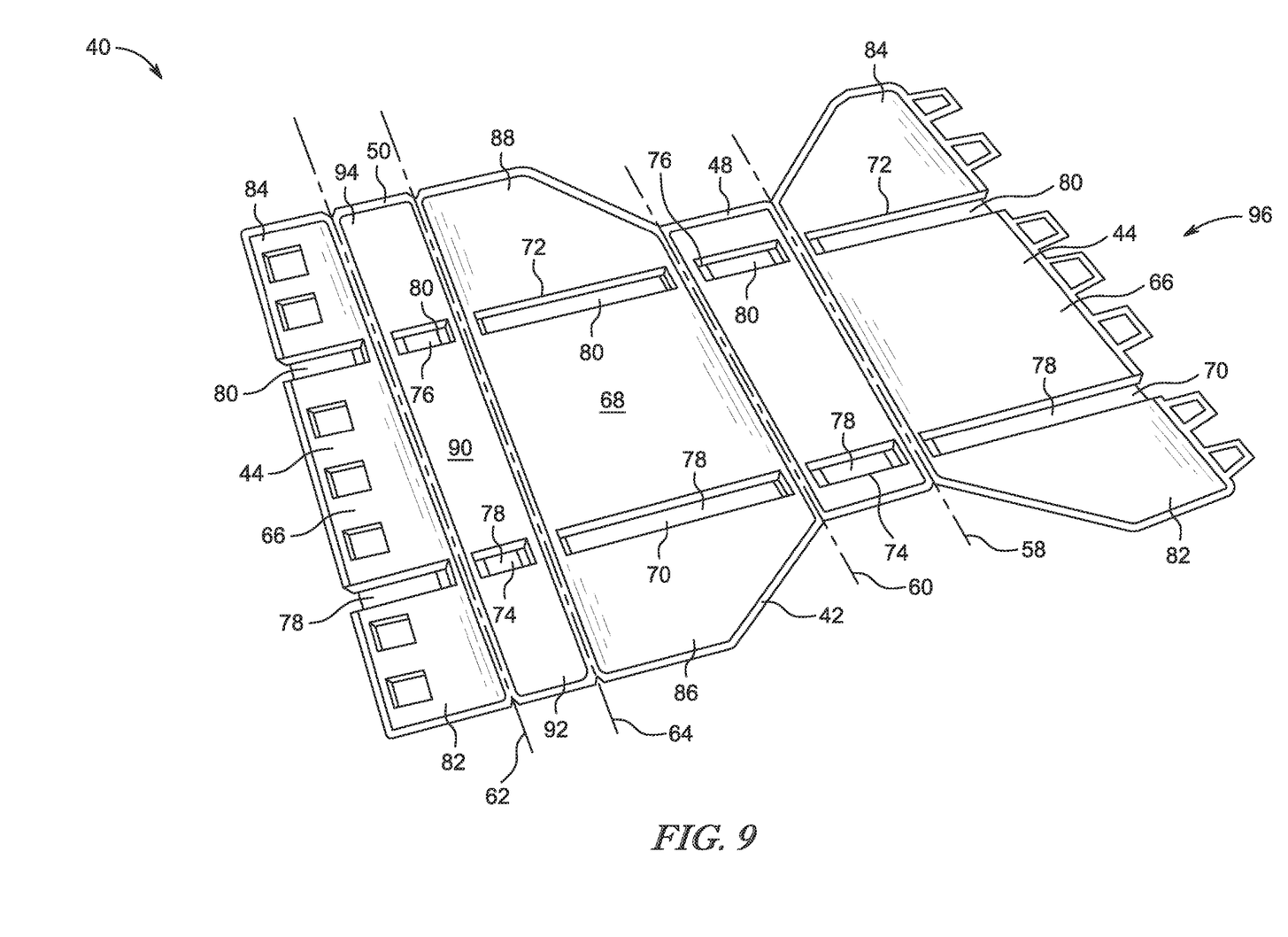
FIG. 9 is a perspective view of the reactive-occupant positioner of FIG. 8 showing the reactive-occupant positioner in an unfolded configuration in which the attachment points of locking mechanisms of the front platform are disconnected.
Figure 10:
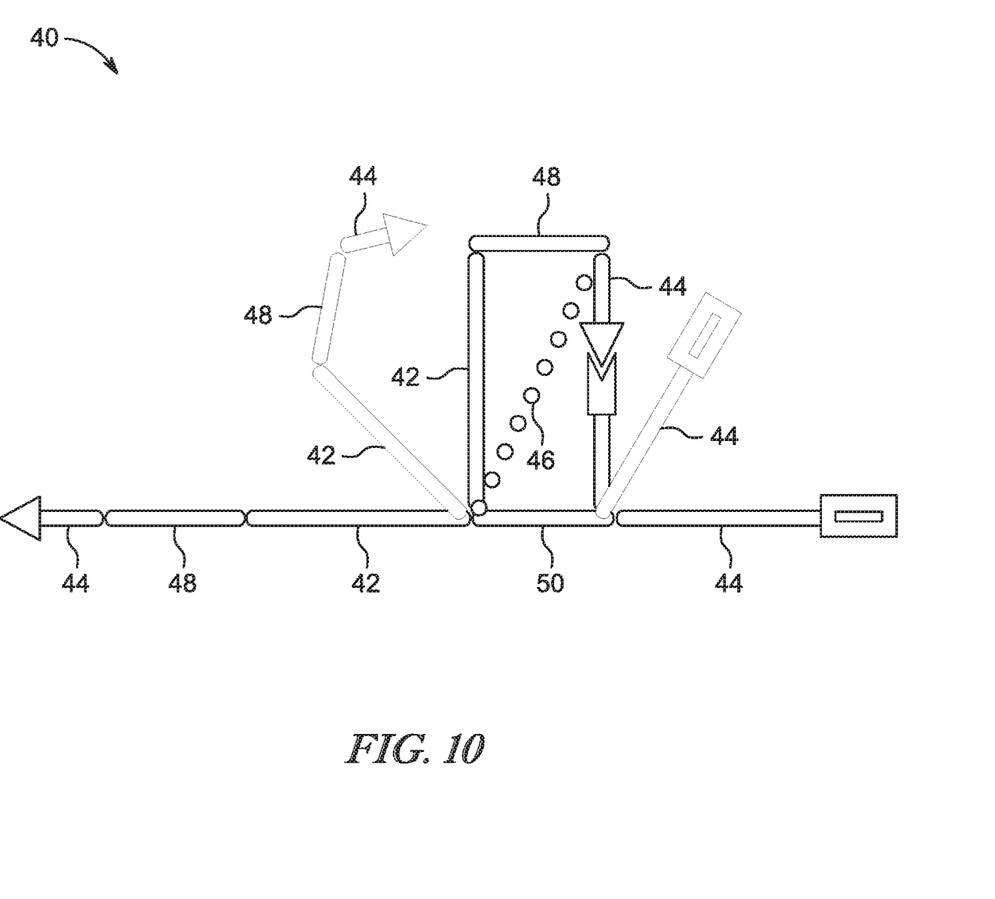
FIG. 10 is a side diagrammatic view of the reactive-occupant positioner of FIGS. 8 and 9 showing the reactive-occupant positioner changing from a fully unfolded configuration, to a transition configuration, and to an assembled configuration.
Figure 11A:
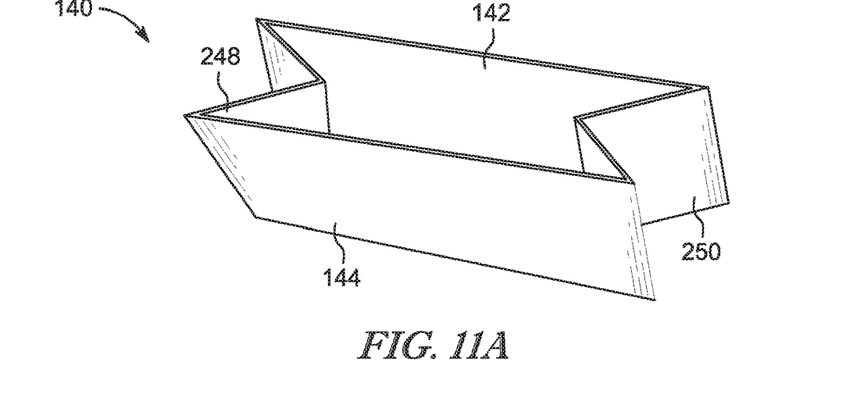
FIG. 11A is a perspective view of another embodiment of a reactive-occupant positioner in accordance with the present disclosure showing that the bias unit includes a first collapsible hinge and a second collapsible hinge, the first and second collapsible hinges are configured to collapse inwardly when the reactive-occupant positioner moves from the pre-event configuration to the event configuration.
Figure 11B:
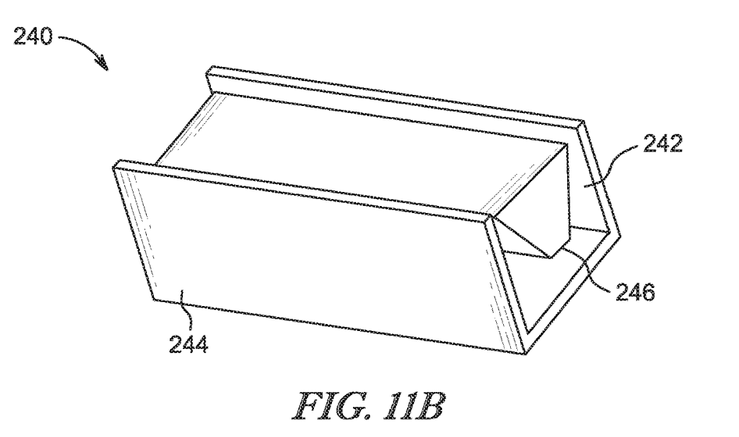
FIG. 11B is a perspective view of another embodiment of a reactive-occupant positioner in accordance with the present disclosure.
Figure 11C:
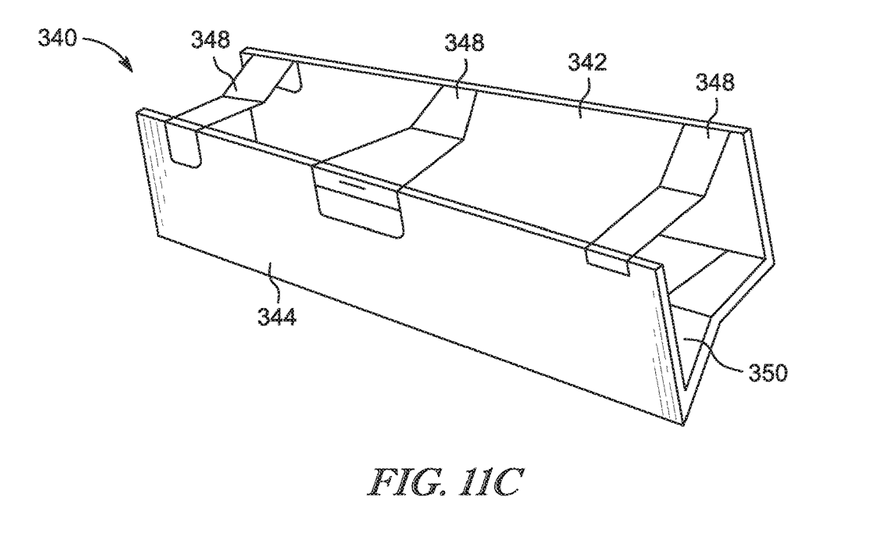
FIG. 11C is a perspective view of another embodiment of a reactive-occupant positioner in accordance with the present disclosure showing that the bias unit includes first, second, third, fourth, fifth, and sixth collapsible hinges, the first, second, third, fourth, fifth, and sixth collapsible hinges are configured to collapse inwardly when the reactive-occupant positioner moves from the pre-event configuration to the event configuration.
Figure 11D:
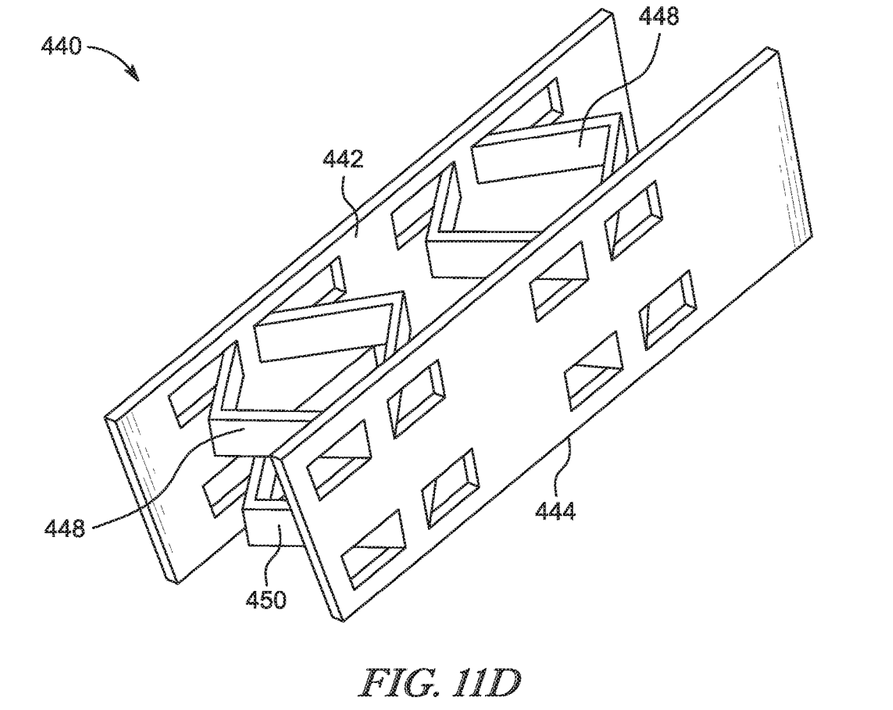
FIG. 11D is a perspective view of another embodiment of a reactive-occupant positioner in accordance with the present disclosure showing that the bias unit includes first, second, third, and fourth rectangular flat springs arranged between the front platform and the rear platform, the first, second, third, and fourth flat springs are configured to compress inwardly to allow the front platform to move toward the rear platform when the reactive-occupant positioner moves from the pre-event configuration to the event configuration.
Figure 11E:
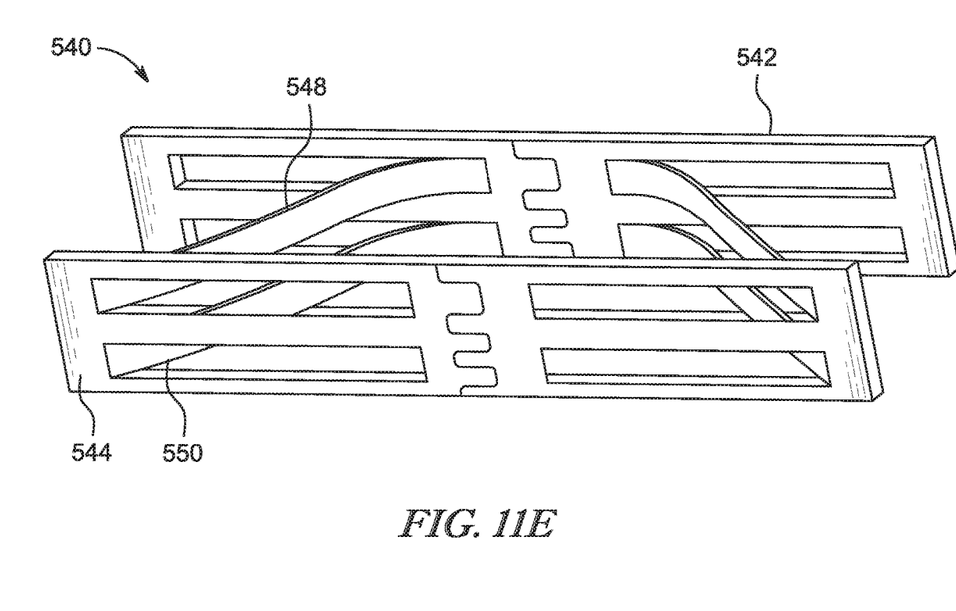
FIG. 11E is a perspective view of another embodiment of a reactive-occupant positioner in accordance with the present disclosure showing that the bias unit includes first and second curved flat springs arranged between the front platform and the rear platform, each of the first and second flat springs are configured to compress inwardly to allow the front platform to move toward the rear platform when the reactive-occupant positioner moves from the pre-event configuration to the event configuration.

A first embodiment of a reactive-occupant positioner 40 of an occupant support 10 is shown in FIGS. 1A-10. In one example, the reactive-occupant positioner 40 of the occupant support 10 is coupled to a seat back 24 of the occupant support 10 and is configured to arrange an occupant 100 of the occupant support 10 in at least three arrangements in response to an impact event to maximize comfort and safety of an occupant during the impact event. A second embodiment of a reactive-occupant positioner 140 is shown in FIG. 11A. Another embodiment of a reactive-occupant positioner 240 is shown in FIG. 11B. Yet another embodiment of a reactive-occupant positioner 340 is shown in FIG. 11C. A further embodiment of a reactive-occupant positioner 440 is shown in FIG. 11D. An additional embodiment of a reactive-occupant positioner 540 is shown in FIG. 11E.

An occupant support 10 for a vehicle in accordance with the present disclosure is shown in FIGS. 1A, 1B, and 3-7B. The occupant support 10 includes a vehicle seat 20 having a seat bottom 22 and a seat back 24 arranged to extend upwardly away from the seat bottom 22. The seat back 24 includes a headrest 26 and backrest 28 located between the headrest 26 and the seat bottom 22. The reactive-occupant positioner 40 is coupled to the seat back 24 and is configured to arrange the occupant 100 in various positions (arrangements) on the occupant support 10 before, during, and after an impact event of the vehicle. In particular, the reactive-occupant positioner 40 is configured to collapse during an impact event such that the occupant's head 104 contacts relatively quickly the headrest 26, thus minimizing potential effects of whiplash during the impact event. Additionally, the reactive-occupant positioner 40 is configured to self-reset and return to the initial position within the seat back 24 after the impact event, thus minimizing the need for the occupant support 10 to be repaired after the impact event.

Figure 1A:
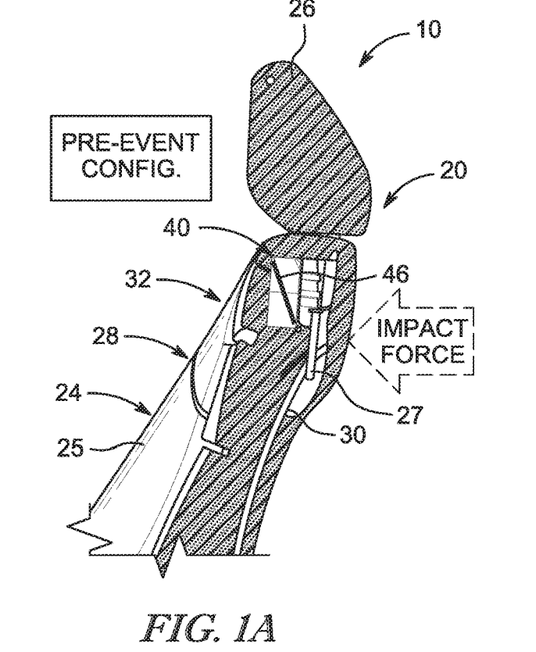
FIG. 1A is a sectional view taken along line 1A-1A of FIG. 6 showing the occupant support including a seat back and a reactive-occupant positioner coupled to the seat back, and suggesting the reactive-occupant support is configured to arrange an occupant of the occupant support in the pre-event arrangement in which a torso of the occupant is arranged a first distance from a frame of the seat back so that comfort is maximized prior to application of an impact force (phantom arrow) to the occupant support.

The reactive-occupant positioner 40 includes a rear platform 42 and a front platform 44 as shown in FIGS. 1A-10. The rear platform is coupled to a frame 30 of the seat back 24 in a fixed position relative to the frame 30. The front platform 44 is located forward of the rear platform 42 and is configured to move relative to the rear platform 42 as shown in FIGS. 1A-10. The reactive-occupant positioner 40 further includes a first arm linkage 48 and a second arm linkage 50 that extend between the rear platform 42 and the front platform 44. The reactive-occupant positioner 40 further includes a bias unit 46 disposed between the rear platform 42 and the front platform 44 that biases the reactive-occupant positioner 40 towards a pre-impact event position in which the reactive-occupant positioner 40 is fully expanded as shown in FIGS. 1A and 2A During an impact event of the vehicle, the occupant 100 of the occupant support 10 may experience a whiplash effect if the headrest 26 is not positioned at a predetermined distance away from the occupant's head 104. In one example, some regulations require that the headrest 26 be positioned very close to the occupant's head 104 in order to minimize the possibility of whiplash. The headrest 26 being very close to the occupant's head 104 may be uncomfortable to the occupant 100, for example, for occupants 100 with larger heads or large hairstyles. This may increase the pain point for the occupant 100. The reactive-occupant positioner 40 allows for the headrest 26 to be placed further back on the seat back 24 and thus further away from the occupant's head 104 by collapsing rapidly during an impact event of the vehicle and allowing the occupant's head 104 to quickly contact the headrest 26. As a result, potential whiplash effects to the occupant 100 are minimized.

The reactive-occupant positioner 40 is arranged in the backrest 28 of the seat back 24, replacing a volume of foam cushion used in this area of the backrest 28 as shown in FIGS. 1A, 1B, and 3-7B. During an impact event, the reactive-occupant positioner 40 is configured to collapse due to loading by the occupant 100 due to the impact event. This allows for the occupant 100 to sink into the backrest 28 faster, allowing the occupant's head 104 to contact the headrest 26 sooner, reducing force on the occupant's neck. The bias unit 46 of the reactive-occupant positioner 40 then biases the reactive-occupant positioner 40 back to the starting position.

In the illustrative embodiment, the reactive-occupant positioner 40 is configured to arrange the occupant 100 in response to the impact event so that the occupant 100 moves from a pre-event arrangement, in which the reactive-occupant positioner 40 is in a pre-event configuration (FIGS. 1A, 2A, and 3-7A), to an event arrangement, in which the reactive-occupant positioner 40 is in an event configuration (FIGS. 1B, 2C, and 7B), and to a post-event arrangement (which may be the pre-event arrangement) in which the reactive-occupant positioner 40 is in a post-event configuration (which may be the pre-event configuration).

Figure 3:
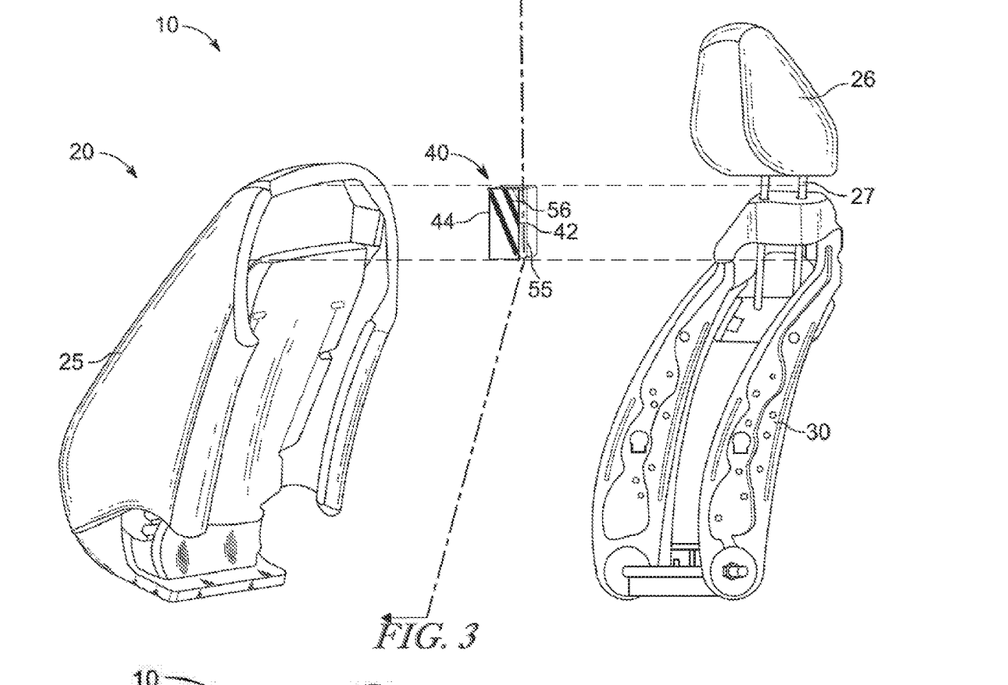
FIG. 3 is a exploded perspective assembly view of the occupant support of FIG. 1A showing that the occupant support includes, from left to right, a backrest cushion, the reactive-occupant positioner, and the frame of the seat back and suggesting that the reactive-occupant positioner is retained in a space formed between the backrest cushion and the frame.
Figures 4, 5:
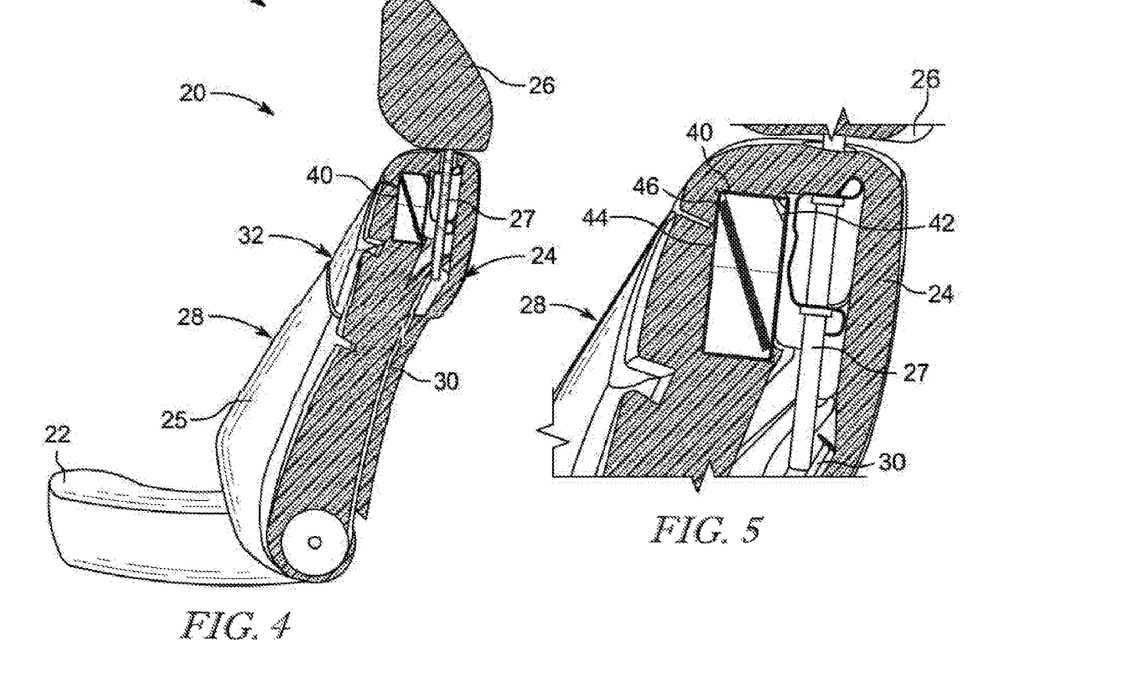
FIG. 4 is a side view of the occupant support of FIG. 1A showing the seat back with a portion removed to show the frame of seat back and the reactive-occupant positioner in the pre-event configuration.
FIG. 5 is an enlarged portion of FIG. 4 showing the rear platform of the reactive-occupant positioner coupled to the frame and the reactive-occupant positioner in the pre-event configuration.
Figure 6:
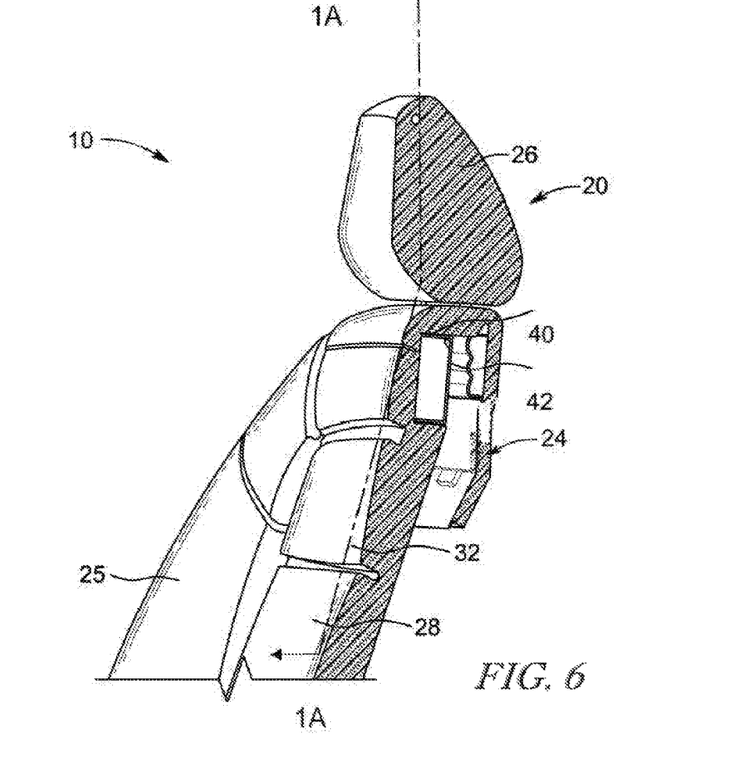
FIG. 6 is a perspective view of the occupant support of FIG. 1A showing the seat back including the backrest having the backrest cushion, the headrest, and the reactive-occupant positioner in the pre-event configuration.

The occupant support 10 includes the vehicle seat 20 as shown in FIGS. 1A, 1B, and 3-7B. The vehicle seat 20 is arranged in the vehicle as any one of the vehicle seats in a vehicle. For example, the vehicle seat 20 may be the passenger side front seat, the driver side front seat, the passenger side rear seat, or the driver side rear seat. The vehicle seat 20 includes the seat bottom 22 and the seat back 24 and is configured to support the occupant 100 of the vehicle seat 20, as shown in FIG. 4. The seat bottom 22 is arranged to overlie a floor of the vehicle and is arranged substantially parallel with the floor. The seat bottom 22 may be configured to raise and lower, as well as pivot, relative to the floor of the vehicle.

The seat back 24 extends substantially vertically away from the seat bottom 22 and supports the back of the occupant 100 of the vehicle seat 20 as shown in FIGS. 1A, 1B, 4, and 6-7B. The seat back 24 includes a backrest cushion 32 formed on a front surface of the backrest 28 of the seat back 24 and configured to engage and support the occupant's torso 102. The seat back 24 further includes left and right bolsters 25 arranged outwardly of the backrest cushion 32 on the sides of the seat back 24 (a portion of the bolster 25 is removed for clarity in FIGS. 1B and 7B). A headrest 26 extends upwardly out of a top surface of the seat back 24 via headrest supports 27 and is positioned to support the occupant's head 104.

The interior of the seat back 24 includes the frame 30 of the seat back 24, the headrest supports 27, and the reactive-occupant positioner 40, as shown in exploded view of FIG. 3. The frame 30 is formed from a rigid material and maintains the general shape of the seat back 24 when assembled. The headrest supports 27 extend through a top portion of the frame 30 and position the headrest 26 above the frame 30, and thus above the seat back 24.

The seat back 24 is formed to include a positioner-receiving space 34 as shown in FIG. 3. The positioner-receiving space 34 is an open space formed to contain the reactive-occupant positioner 40. In the illustrative embodiment, the reactive-occupant positioner 40 is coupled to the top portion of the frame 30 of the vehicle seat 20 via the rear platform 42 being fastened to the top portion of the frame 30 as shown in FIG. 3. The top portion of the frame 30 may be trapezoid-shaped so as to match the general trapezoidal shape of the reactive-occupant positioner 40 in some embodiments. In other embodiments, the reactive-occupant positioner 40 may not be coupled fixedly to the frame 30, but instead may rest within the positioner-receiving space 34, held in place by the top portion of the frame 30.

The reactive-occupant positioner 40 is shown in detail in FIGS. 2A, 2B, 5, and 8-10. As discussed above, during an impact event of the vehicle, in particular a rear impact of the vehicle, the occupant's torso 102 will be forced backwards into the backrest cushion 32 (see "impact force" in FIGS. 1A and 1B). When the occupant's torso 102 loads the backrest cushion 32 rearward, the backrest cushion 32 loads the front platform 44 of the reactive-occupant positioner 40 and pushes the front platform 44 rearwards toward the rear platform 42 (see FIGS. 2B and 2C). The rapid collapse of the reactive-occupant positioner 40 during the impact event of the vehicle allows the occupant's head 104 to quickly contact the headrest 26. As a result, potential whiplash effects to the occupant 100 are reduced.

The reactive-occupant positioner 40 includes the rear platform 42 coupled to a frame 30 of the seat back 24 and the front platform 44 arranged forward of the rear platform 42 and configured to move relative thereto as shown in FIGS. 1A-10. The reactive-occupant positioner 40 further includes the first and second arm linkages 48, 50 that extend between the rear platform 42 and the front platform 44. The first arm linkage 48 is pivotably coupled to a first top edge of the front platform 44 and a second top edge of the rear platform 42. The second arm linkage 50 is coupled pivotably to a first bottom edge of the front platform 44 and a second bottom edge of the rear platform 42. The reactive-occupant positioner 40 further includes the bias unit 46 disposed between the rear platform 42 and the front platform 44 that biases the reactive-occupant positioner 40 towards the pre-event configuration and the post-event configuration.

The bias unit 46 is coupled to an upper portion of the front platform 44 and to a lower portion of the rear platform 42 as shown in FIGS. 2A-2C and 8-10. The bias unit 46 is configured to bias the front platform 44 away from the rear platform 42 toward the pre-event configuration of the reactive-occupant positioner 40 prior to application of the impact force to the occupant support 10 and toward the post-impact configuration of the reactive-occupant positioner 40 after application of the impact force to the occupant support 10.

Figure 2A:
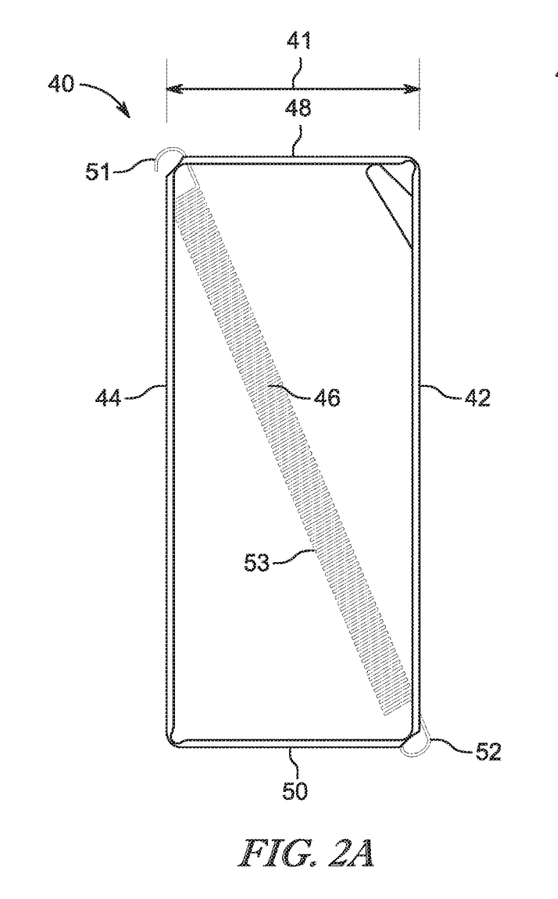
FIG. 2A is a side view of the reactive-occupant positioner of FIG. 1A in the pre-event configuration and showing that the reactive-occupant includes a front platform, a rear platform, a first arm linkage, a second arm linkage, and a bias unit, and suggesting that, in the pre-event configuration, the reactive-occupant positioner has a thickness defined between the front platform and the rear platform.
Figure 2B:
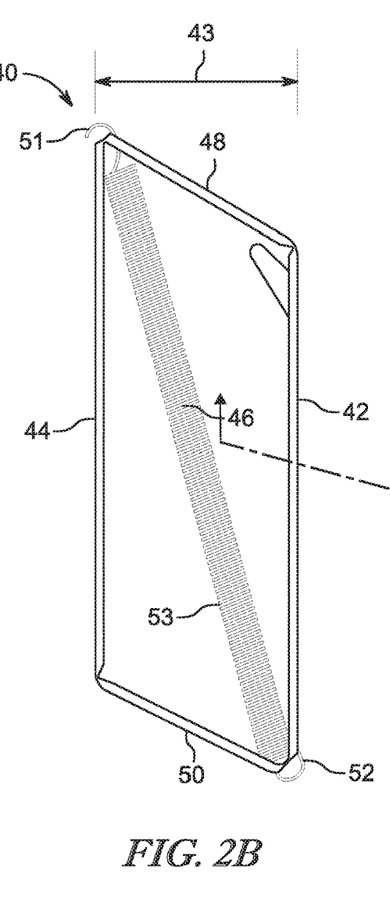
FIG. 2B is a view similar to FIG. 2A showing the reactive-occupant positioner moving between the pre-event configuration and the event configuration to cause the reactive-occupant positioner to have a thickness that is less than the thickness shown in FIG. 2A.
Figure 2C:
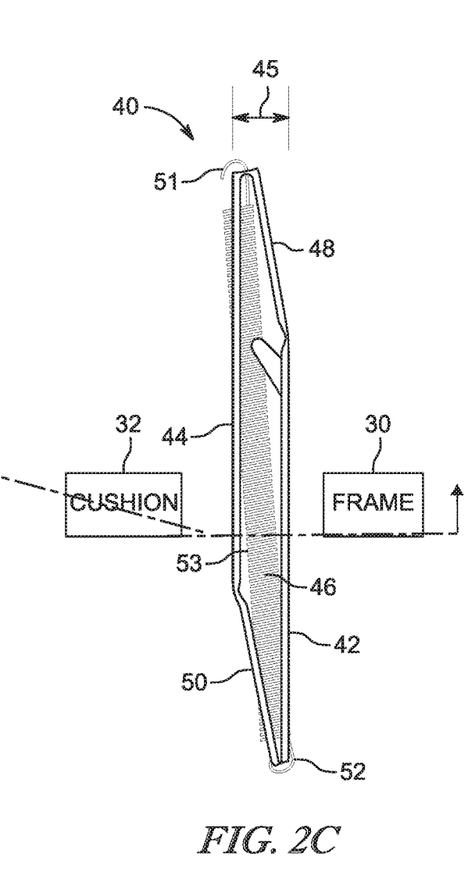
FIG. 2C is a view similar to FIG. 2B showing the reactive-occupant positioner in the event configuration in which the reactive-occupant positioner has a thickness that is less than the thicknesses shown in FIGS. 2A and 2B.

When the reactive-occupant positioner 40 moves from the pre-event configuration to the event configuration, the first arm linkage 48 and the second arm linkage 50 pivot upwardly and toward the rear platform such that a biasing force of the bias unit 46 increases as shown in FIGS. 2A-2C. When the reactive-occupant positioner 40 moves from the event configuration to the post-event configuration, the first arm linkage 48 and the second arm linkage 50 pivot downwardly and away from the rear platform 42 such that a biasing force of the bias unit 46 decreases as shown in FIGS. 2A-2C. When the reactive-occupant positioner 40 is in the event configuration, the front platform 44 is moved as far as possible toward the rear platform 42 until the front platform 44 hits a stopper 47 arranged on the rear platform 42.

Figure 8:
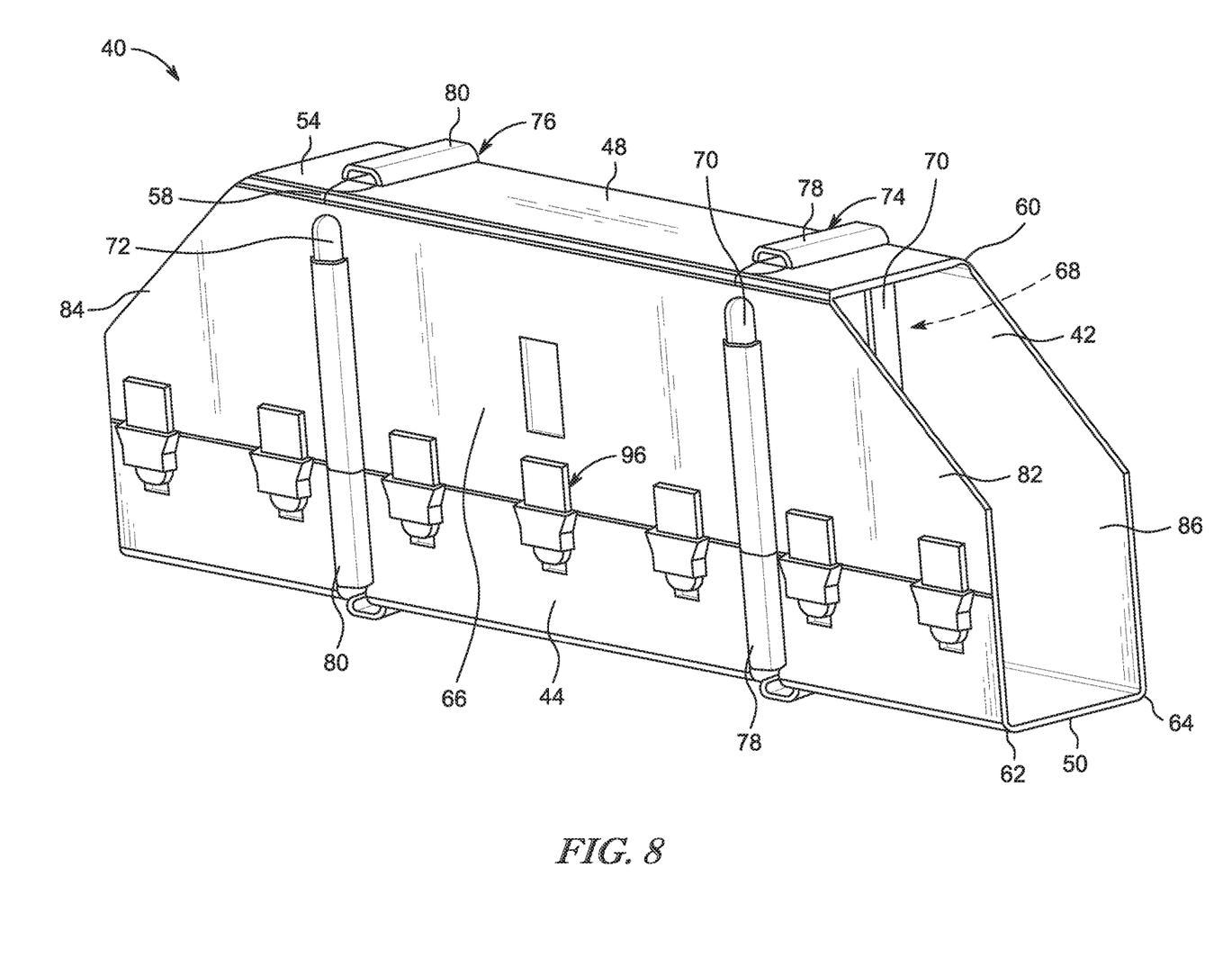
FIG. 8 is a perspective view of the reactive-occupant positioner of FIG. 1A showing the reactive-occupant positioner in the pre-event configuration.

The reactive-occupant positioner 40 is shown in greater detail in FIGS. 8 and 9. In the illustrative embodiment, the front platform 44 and the rear platform 42 are formed to have the same shape, in particular, a trapezoidal shape. The rear platform 42 includes a rear main portion 68 that is generally rectangular shaped, and a first wing 86 and a second wing 88 that extend longitudinally outwardly away from the rear main portion 68. The first and second wings 86, 88 are formed to be the same height as the rear main portion 68 so as to create the trapezoidal shape. Likewise, the front platform 44 includes a front main portion 66 that is generally rectangular shaped, and a first wing 82 and a second wing 84 that extend longitudinally outwardly away from the front main portion 66. The first and second wings 82, 84 are formed to be the same height as the front main portion 66 so as to create the trapezoidal shape.

In the illustrative embodiment, the front platform 44, the rear platform 42, the first arm linkage 48, and the second arm linkage 50 are formed of the same material. The material may be metal or steel such that the reactive-occupant positioner 40 is capable of withstanding substantial impact forces imparted by the occupant 100 of the occupant support 10. Other rigid materials such as heavy duty plastics may be used as well, so long as the reactive-occupant positioner 40 is capable of withstanding typical impact forces during vehicle impact events.

The first arm linkage 48 and the second arm linkage 50 are formed as similarly shaped rectangular pieces, as shown in FIGS. 8 and 9. In the illustrative embodiment, the width of the first and second arm linkages 48, 50 is approximately half the height of the front and rear platforms 44, 42. The second arm linkage 50 is longer than the first arm linkage 48 in order to accommodate for the bottom portion of each wing 82, 84, 86, 88 of the front platform 44 and the rear platform 42. Specifically, the second arm linkage 50 includes a first extension 92 and a second extension 94 that each extend outwardly away from a main portion 90 of the second arm linkage 50.

The first arm linkage 48 is coupled pivotably to the first top edge of the front platform 44 via a first hinge 58 and to the second top edge of the rear platform 42 via a second hinge 60. The second arm linkage 50 is coupled pivotably to the first bottom edge of the front platform 44 via a third hinge 62 and to the second bottom edge of the rear platform 42 via a fourth hinge 64. The hinges 58, 60, 62, 64 may be formed of a resilient material capable of securely holding the structure of the reactive-occupant positioner together while also permitting bending of the hinges 58, 60, 62, 64. In some embodiments, the first and second hinges 58, 60 are living hinges.

The bias unit 46 includes a first coupling member 51, a second coupling member 52, and a first biasing member 53 as shown in FIGS. 2A-2C. The first coupling member 51 is arranged on a first end of the first biasing member 53 and is coupled to a top portion of the front platform 44. The second coupling member 52 is arranged on a second end of the first biasing member 53 and is coupled to a bottom portion of the rear platform 42. In the illustrative embodiment, the bias unit 46 further includes a third coupling member 54, a fourth coupling member 55, and a second biasing member 56. The third coupling member 54 is arranged on a first end of the second biasing member 56 and is coupled to the top portion of the front platform 44, and the fourth coupling member 55 is arranged on a second end of the second biasing member 56 and is coupled to the bottom portion of the rear platform 42.

In some embodiments, the first and second biasing members 53, 56 are springs, in particular, tension springs as shown in FIGS. 2A-2C. In other embodiments, the biasing members 53, 56 may include other types of biasing means, such as using resilient materials such as rubber. The bias unit 46 of the reactive-occupant positioner 40 includes more than two biasing members, such as three or four biasing members. It can be further envisioned that the bias unit 46 of the reactive-occupant positioner 40 only includes a single biasing member, so long as the biasing force of the single biasing member is capable of moving the reactive-occupant positioner 40 to the post-event configuration.

The front main portion 66 and the rear main portion 68 each have a first opening 70 configured to accommodate the first biasing member 53 when the reactive-occupant positioner 40 is moved to the event configuration and is in the event configuration, as shown in FIGS. 8 and 9. The front main portion 66 and the rear main portion 68 each further include a second opening 72 configured to accommodate the second biasing member 56 when the reactive-occupant positioner 40 is moved to the event configuration and is in the event configuration, as also shown in FIGS. 8 and 9.

Likewise, the first arm linkage 48 and the second arm linkage 50 each have a third opening 74 configured to accommodate the first biasing member 53 when the reactive-occupant positioner 40 is moved to the event configuration and is in the event configuration, and a fourth opening 76 configured to accommodate the second biasing member 56 when the reactive-occupant positioner 40 is moved to the event configuration and is in the event configuration.

Each of the front platform 44, the rear platform 42, the first arm linkage 48, and the second arm linkage 50 includes a first opening cover 78 and a second opening cover 80 that are arranged to cover a majority of each of the first, second, third, and fourth openings 70, 72, 74, 76, as shown in FIGS. 8 and 9. The covers 78, 80 prevent portions of the biasing member 53, 56 from contacting the inner surface of the backrest cushion 32 and the frame 30 when the reactive-occupant positioner 40 is moved to the event configuration and is in the event configuration. Each of the first and second opening covers 78, 80 of the front platform 44 is arranged to extend outwardly away from the rear platform 42. Likewise, each of the first and second opening covers 78, 80 of the first arm linkage 48 is arranged to extend away from the second arm linkage 50. Likewise, each of the first and second opening covers 78, 80 of the rear platform 42 is arranged to extend toward the frame 30 of the seat back 24 and away from the front platform 44.

In the illustrative embodiment, the first coupling member 51 and the third coupling member 54 each include a hook member that extends through a respective portion of the third opening 74 and the fourth opening 76 of the first arm linkage 48 that is not covered by the first and second opening covers 78, 80 of the first arm linkage 48. Likewise, the second coupling member 52 and the fourth coupling member 55 each include a hook member that extends through a respective portion of the first opening 70 and the second opening 72 of the rear surface of platform 42 that is not covered by the first and second opening covers 78, 80 of the rear surface of platform 42. In other embodiments, the biasing members 53, 56 may be attached to the first top edge of the front platform 44 and to the second bottom edge of the rear platform 42 via other fastening means, so long as the biasing members 53, 56 are capable of expanding and contracting within the reactive-occupant positioner 40.

In some embodiments, the front platform 44, including the front main portion 66, the first wing 82, and the second wing 84, includes a top portion and a bottom portion that are coupled together via a plurality of locking mechanisms 96. The locking mechanism 96 are latches as shown in FIGS. 8 and 9. In other embodiments, the locking mechanisms 96 may be configured as clasps, clamps, catches, adhesives, combinations thereof, or any other suitable mechanisms that would securely hold the front platform 44 together. The separation of the front platform 44 into two portions allows for efficient assembly of the reactive-occupant positioner 40. As can be seen in FIGS. 9 and 10, during assembly, the reactive-occupant positioner 40 may be folded upwardly (see FIG. 10) such that the top portion of the front platform 44 moves toward the bottom portion of the front platform 44. The top and bottom portions are then locked in place via the locking mechanisms 96, and then the biasing members 53, 56 may be inserted and arranged in place within the reactive-occupant positioner 40.

In some embodiments, the front and rear platforms 44, 42 may be configured as different shapes, with the front and rear platforms 44, 42 not being the same shape. Moreover, the front and rear platforms 44, 42 may be sized differently such that the first and second arm linkages 48, 50 are not half as wide as the platforms 42, 44 are high, as described above.

The various arrangements of the occupant 100 and the configurations of the reactive-occupant positioner 40 will be described in detail with reference to FIGS. 1A-10. Before an impact event of the vehicle, the occupant 100 is arranged in the pre-event arrangement, as shown in FIGS. 1A, 2A, and 4-7A. In the pre-event arrangement, the occupant's torso 102 is arranged at a first distance 31 from the frame 30 of the seat back 24 (see FIG. 7A) so that comfort is maximized prior to the impact event. In order to keep the occupant 100 in the pre-event arrangement before the impact event, the reactive-occupant positioner 40 is in a pre-event configuration, as shown in FIGS. 1A, 2A, and 4-7A. In the pre-event configuration, the reactive-occupant positioner 40 has a first thickness 41 defined between the front platform 44 and the rear platform 42, as shown in FIG. 2A.

Once the vehicle is involved in a collision, in particular a rear collision, an impact force (see FIGS. 1A and 1B) will be applied to the occupant support 10. As the occupant 100 experiences the impact force, the occupant 100 will be forced rearwards into the backrest cushion 32, which is subsequently forced rearwards into the front platform 44. The backrest cushion 32 will compress as well during this movement. Once this happens, the front platform 44 of the reactive-occupant positioner 40 begins to move rearward, as shown in FIG. 2B. The reactive-occupant positioner 40 assumes a thickness 43 in a mid-impact position, as shown in FIG. 2B. As the front platform 44 begins to move rearward, the bias unit 46 begins to become tensioned. As can be seen in FIGS. 2A-2C, the spring of the bias unit 46 is expanded by the first arm linkage 48 moving upwardly and rearwardly and by the front platform 44 moving upwardly and rearwardly.

Figure 1B:
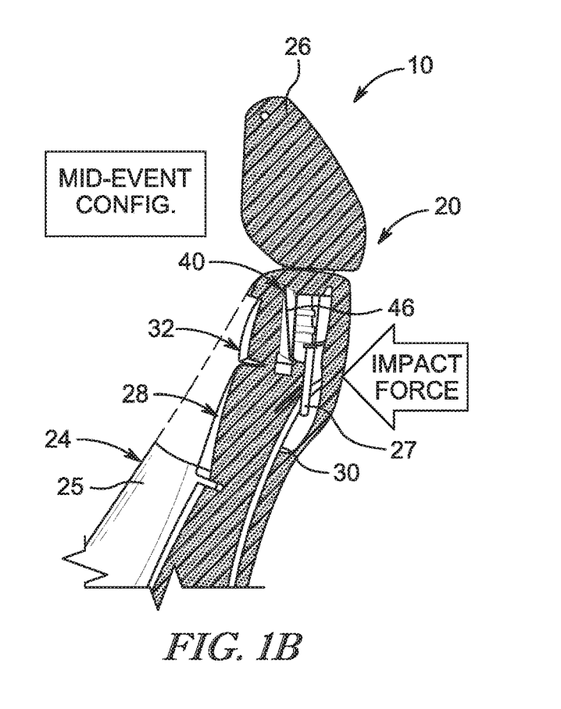
FIG. 1B is a view similar to FIG. 1A showing the reactive-occupant support configured to arrange an occupant of the occupant support in the event arrangement in which the torso of the occupant is arranged a second distance from the frame that is less than the first distance so that a head of the occupant engages the headrest to minimize whiplash of the occupant during the impact event.
Figure 7A:
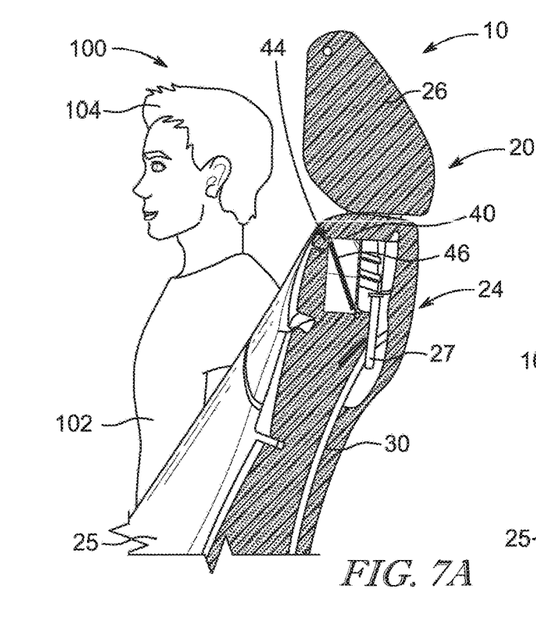
FIG. 7A is a diagrammatic view of the occupant support of FIG. 1A showing an occupant positioned in the occupant support and suggesting that the seat back cushion along with the reactive-occupant positioner arranges the occupant in the pre-event arrangement in which the torso of the occupant is arranged a first distance from the frame of the seat back so that comfort is maximized prior to application of an impact force to the occupant support.
Figure 7B:
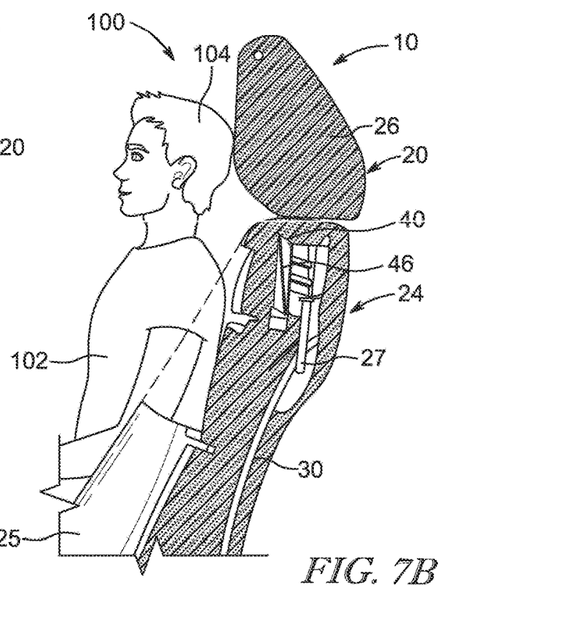
FIG. 7B is a view similar to FIG. 7A showing the occupant positioned in the occupant support after an impact event and suggesting that the seat back cushion along with the reactive-occupant positioner arranges the occupant in the event arrangement in which the torso of the occupant is arranged a second distance from the frame that is less than the first distance so that a head of the occupant engages the headrest to minimize whiplash of the occupant during the impact event.

After the impact force has been applied to the occupant support 10 and the occupant 100 of the occupant support 10 has sunken fully into the seat back 24 by pushing rearward on the backrest cushion 32, the occupant 100 is in the event arrangement and the reactive-occupant positioner 40 is in the event configuration, as shown in FIGS. 1B, 2C, and 7B. In the event arrangement of the occupant 100, the occupant's torso 102 is arranged at a second distance 33 from the frame 30 of the seat back 24 (see FIG. 7B) that is less than the first distance 31 so that the occupant's head 104 engages the headrest 26 (see FIG. 7B). In this arrangement, whiplash of the occupant 100 is minimized during the impact event due to the occupant 100 rapidly moving rearward and the occupant's head 104 rapidly contacting the headrest 26.

The occupant 100 being in the event arrangement is enabled by the reactive-occupant positioner 40 moving to and being in the event configuration, as shown in FIGS. 1B, 2C, and 7B. In the event configuration, the reactive-occupant positioner 40 has a second thickness 45 defined between the front platform 44 and the rear platform 42 that is less than the first thickness 41. In the event configuration, the reactive-occupant positioner 40 is fully collapsed. Specifically, the front platform 44 is moved rearward as far as possible toward the rear platform 42 such that the inner surface of the front platform 44 contacts the stopper 47. Furthermore, the biasing members 53, 56 are fully tensioned.

After the impact event is complete, the occupant 100 may move to a post-event arrangement and the reactive-occupant positioner 40 moves to a post-event configuration. In the post-event arrangement, the occupant's torso 102 is arranged a third distance from the frame 30 that is greater than the second distance. Specifically, the reactive-occupant positioner 40 moving to the post-event configuration will move the backrest cushion 32 back towards its original position on the seat back 24. In some embodiments, the third distance is about equal to the first distance, and in other embodiments, the third distance is equal to the first distance. In this case, the post-event configuration and the pre-event configuration of the reactive-occupant positioner 40, and as such the post-event arrangement and the pre-event arrangement of the occupant 100, are the same. The returning of the backrest cushion 32, and as such the seat back 24, to their original configurations after the impact event allow the occupant support 10 to continue to be used in the vehicle without repair of the seat back 24 or the reactive-occupant positioner 40.

In a second embodiment, the occupant support 10 includes a reactive-occupant positioner 140 including a bias unit 146 having a first collapsible hinge 148 and a second collapsible hinge 150, as shown in FIG. 11A. The first collapsible hinge 148 is arranged on a first side end of a front platform 144 and a corresponding first side end of a rear platform 142. The second collapsible hinge 150 is arranged on a second side end of the front platform 144 and a corresponding second side end of the rear platform 142. The first and second collapsible hinges 148, 150 are configured to collapse inwardly when the reactive-occupant positioner 140 moves from the pre-event configuration to the event configuration. In the illustrative embodiment, the reactive-occupant positioner 140 does not include the first and second arm linkages 48, 50 described above, and instead is open on the top and bottom of the reactive-occupant positioner 140.

In a third embodiment, the occupant support 10 includes a reactive-occupant positioner 240 as shown in FIG. 11B. The reactive-occupant positioner 240 including a bias unit 246 arranged to extend between a front platform 244 and a rear platform 242 as shown in FIG. 11B.

In a fourth embodiment, the occupant support 10 includes a reactive-occupant positioner 340 including a bias unit 346 having a plurality of collapsible hinges 348, 350, as shown in FIG. 11C. A first plurality of collapsible hinges 348 include first, second, and third collapsible hinges 348 arranged on a first top edge of a front platform 344 and a first top edge of a rear platform 342. A second plurality of collapsible hinges 350 includes fourth, fifth, and sixth collapsible hinges 350 arranged on a first bottom edge of the front platform 344 and a second bottom edge of the rear platform 342. The first, second, third, fourth, fifth, and sixth collapsible hinges 348, 350 are configured to collapse inwardly when the reactive-occupant positioner moves from the pre-event configuration to the event configuration. Similarly to second embodiment of the reactive-occupant positioner 140, the reactive-occupant positioner 340 does not include the first and second arm linkages 48, 50 described above, and instead is open on the top and bottom of the reactive-occupant positioner 340.

In a fifth embodiment, the occupant support 10 includes a reactive-occupant positioner 440 including a bias unit 446 having rectangular flat springs, as shown in FIG. 11D. Specifically, the bias unit 446 includes first and second rectangular flat springs 448 arranged between a front platform 444 and a rear platform 442. Third and fourth rectangular flat springs 450 are arranged beneath the first and second rectangular platforms 448 between the front platform 444 and the rear platform 442. The first, second, third, and fourth flat springs 448, 450 are configured to compress inwardly to allow the front platform 444 to move toward the rear platform 442 when the reactive-occupant positioner moves from the pre-event configuration to the event configuration. The front and rear platforms 444, 442 may include holes to accommodate for compression of the flat springs 448, 450.

In a sixth embodiment, the occupant support 10 includes a reactive-occupant positioner 540 including a bias unit 546 having semi-circular flat springs 548, 550. Specifically, the bias unit 546 includes first and second semi-circular flat springs 548, 550 arranged between a front platform 544 and a rear platform 542. A first and second end of each of the first and second flat springs 548, 550 are attached to the front platform 544 and a midpoint of each of the first and second flat springs 548, 550 is attached to the rear platform 542. Each of the first and second flat springs 548, 550 is configured to compress inwardly to allow the front platform 544 to move toward the rear platform 542 when the reactive-occupant positioner moves from the pre-event configuration to the event configuration. The front and rear platforms 544, 542 may include holes to accommodate for compression of the semi-circular flat springs 548, 550.

The following numbered clauses include embodiments that are contemplated and non-limiting:

Clause 1. An occupant support comprising a seat bottom and a seat back coupled to the seat bottom and arranged to extend upwardly away from the seat bottom, the seat back including a headrest located in spaced apart relation above the seat bottom and a backrest located between the headrest and the seat bottom.

Clause 2. The occupant support of clause 1, any other clause, or combination of clauses, further comprising a reactive-occupant positioner coupled to the seat back to move therewith and configured to arrange an occupant on the occupant support in response to an impact event so that the occupant moves from a pre-event arrangement, to an event arrangement, and to a post-event arrangement.

Clause 3. The occupant support of clause 2, any other clause, or combination of clauses, wherein, in the pre-event arrangement, a torso of the occupant is arranged a first distance from a frame of the seat back so that comfort is maximized prior to application of an impact force to the occupant support, in the event arrangement, the torso of the occupant is arranged a second distance from the frame that is less than the first distance so that a head of the occupant engages the headrest to minimize whiplash of the occupant during the impact event, and in the post-event arrangement, the torso of the occupant is arranged a third distance from the frame that is greater than the second distance after the impact event is complete without repair of the reactive-occupant positioner.

Clause 4. The occupant support of clause 3, any other clause, or combination of clauses, wherein, in response to the impact event, the reactive-occupant positioner changes from a pre-event configuration in which the reactive-occupant positioner causes the occupant to be in the pre-event arrangement, to an event configuration in which the reactive-occupant positioner causes the occupant to be in the event arrangement.

Clause 5. The occupant support of clause 4, any other clause, or combination of clauses, wherein the reactive-occupant positioner includes a rear platform coupled to the seat back to move therewith and a front platform movable relative to the rear platform.

Clause 6. The occupant support of clause 5, any other clause, or combination of clauses, wherein, in the pre-event configuration, the reactive-occupant positioner has a first thickness defined between the front platform and the rear platform, in the event configuration, the reactive-occupant positioner has a second thickness defined between the front platform and the rear platform that is less than the first thickness, and, in the post-event configuration, the reactive-occupant positioner has a third thickness defined between the front platform and the rear platform that is greater than the second thickness.

Clause 7. The occupant support of clause 6, any other clause, or combination of clauses, wherein the reactive-occupant positioner further includes a bias unit coupled to the front platform and to the rear platform and configured to bias the front platform away from the rear platform toward the pre-event configuration of the reactive-occupant positioner prior to application of the impact force and toward the post-impact configuration of the reactive-occupant positioner after application of the impact force to the occupant support.

Clause 8. The occupant support of clause 7, any other clause, or combination of clauses, wherein the reactive-occupant positioner further includes a first arm linkage and a second arm linkage, the first arm linkage pivotably coupled to a first top edge of the front platform and a second top edge of the rear platform, and the second arm linkage pivotably coupled to a first bottom edge of the front platform and a second bottom edge of the rear platform.

Clause 9. The occupant support of clause 8, any other clause, or combination of clauses, wherein, when the reactive-occupant positioner moves from the pre-event configuration to the event configuration, the first arm linkage and the second arm linkage pivot upwardly and toward the rear platform such that a biasing force of the bias unit increases.

Clause 10. The occupant support of clause 9, any other clause, or combination of clauses, wherein, when the reactive-occupant position moves from the event configuration to the post-event configuration, the first arm linkage and the second arm linkage pivot downwardly and away from the rear platform such that a biasing force of the bias unit decreases.

Clause 11. The occupant support of clause 8, any other clause, or combination of clauses, wherein the bias unit includes a first coupling member, a second coupling member, and a first biasing member, the first coupling member arranged on a first end of the first biasing member and coupled to a top portion of the front platform, and the second coupling member arranged on a second end of the first biasing member and coupled to a bottom portion of the rear platform.

Clause 12. The occupant support of clause 11, any other clause, or combination of clauses, wherein the biasing member is a spring.

Clause 13. The occupant support of clause 5, any other clause, or combination of clauses, wherein the backrest includes a backrest cushion configured to engage and support the torso of the occupant and located in spaced-apart relation to the frame, and the front platform is arranged adjacent to the backrest cushion between the rear platform.

Clause 14. The occupant support of clause 13, any other clause, or combination of clauses, wherein, in response to the impact event, the torso of the occupant pushes on the backrest cushion which in turn pushes on the front platform so as to move the front platform toward the rear platform such that the reactive-occupant positioner moves from the pre-event configuration to the post-event configuration.

Clause 15. The occupant support of clause 3, any other clause, or combination of clauses, wherein the first distance is about equal to the third distance.

Clause 16. The occupant support of clause 11, any other clause, or combination of clauses, wherein the bias unit further includes a third coupling member, a fourth coupling member, and a second biasing member, the third coupling member arranged on a first end of the second biasing member and coupled to the top portion of the front platform, and the fourth coupling member arranged on a second end of the second biasing member and coupled to the bottom portion of the rear platform.

Clause 17. The occupant support of clause 16, any other clause, or combination of clauses, wherein the first arm linkage is pivotably coupled to the first top edge of the front platform via a first hinge and to the second top edge of the rear platform via a second hinge, and the second arm linkage is pivotably coupled to the first bottom edge of the front platform via a third hinge and to the second bottom edge of the rear platform via a fourth hinge.

Clause 18. The occupant support of clause 17, any other clause, or combination of clauses, wherein the front platform includes a front main portion and the rear platform includes a rear main portion, and wherein the front main portion and the rear main portion each have a first opening configured to accommodate the first biasing member when the reactive-occupant positioner is moved to the event configuration and is in the event configuration, and a second opening configured to accommodate the second biasing member when the reactive-occupant positioner is moved to the event configuration and is in the event configuration.

Clause 19. The occupant support of clause 18, any other clause, or combination of clauses, wherein the first arm linkage and the second arm linkage each have a third opening configured to accommodate the first biasing member when the reactive-occupant positioner is moved to the event configuration and is in the event configuration, and a fourth opening configured to accommodate the second biasing member when the reactive-occupant positioner is moved to the event configuration and is in the event configuration.

Clause 20. The occupant support of clause 19, any other clause, or combination of clauses, wherein each of the front platform, the rear platform, the first arm linkage, and the second arm linkage includes a first opening cover and a second opening cover that are arranged to cover a majority of each of the first, second, third, and fourth openings.

Clause 21. The occupant support of clause 20, any other clause, or combination of clauses, wherein the first coupling member and the third coupling member each include a hook member that extends through a respective portion of the third opening and the fourth opening of the first arm linkage not covered by the first and second opening covers of the first arm linkage.

Clause 22. The occupant support of clause 21, any other clause, or combination of clauses, wherein the second coupling member and the fourth coupling member each include a hook member that extends through a respective portion of the first opening and the second opening of the rear surface platform not covered by the first and second opening covers of the rear surface platform.

Clause 23. The occupant support of claim 22, any other clause, or combination of clauses, wherein the front platform defines a first plane and further includes a first wing and a second wing that each extend outwardly away from the front main portion of the front platform in the first plane, and the rear platform defines a second plane and further includes a third wing and a fourth wing that each extend away from the rear main portion in the second plane.

Clause 24. The occupant support of claim 23, any other clause, or combination of clauses, wherein a transverse extent of the front platform is equal to a transverse extent of the rear platform, and wherein a transverse extent of the first arm linkage is equal to a transverse extent of the second arm linkage, and wherein the transverse extent of the front and rear platforms is greater than the transverse extent of the first and second arm linkages.

Clause 25. The occupant support of clause 24, any other clause, or combination of clauses, wherein the second arm linkage defines a third plane and includes a first extension and a second extension that each extend outwardly away from a main portion of the second arm linkage in the third plane.

Clause 26. The occupant support of clause 25, any other clause, or combination of clauses, wherein the second arm linkage is pivotably coupled to (i) the first bottom edge of the front platform and bottom edges of the first and second wings and (ii) the second bottom edge of the rear platform and bottom edges of the third and fourth wings via the third hinge and the fourth hinge.

Clause 27. The occupant support of clause 26, any other clause, or combination of clauses, wherein the front platform, including the front main portion, the first wing, and the second wing, includes a top portion and a bottom portion that are coupled together via a plurality of locking mechanisms.

Clause 28. The occupant support of clause 20, any other clause, or combination of clauses, wherein each of the first and second opening covers of the front platform is arranged to extend outwardly away from the rear platform.

Clause 29. The occupant support of clause 20, any other clause, or combination of clauses, wherein each of the first and second opening covers of the first arm linkage is arranged to extend away from the second arm linkage.

Clause 30. The occupant support of clause 20, any other clause, or combination of clauses, wherein each of the first and second opening covers of the rear platform is arranged to extend toward the frame away from the front platform.

Clause 31. The occupant support of clause 17, any other clause, or combination of clauses, wherein the first and second hinges are living hinges.

Clause 32. The occupant support of clause 7, any other clause, or combination of clauses, wherein the bias unit includes a first collapsible hinge arranged on a first side end of the front platform and a corresponding first side end of the rear platform and a second collapsible hinge arranged on a second side end of the front platform and a corresponding second side end of the rear platform, the first and second collapsible hinges configured to collapse inwardly when the reactive-occupant positioner moves from the pre-event configuration to the event configuration.

Clause 33. The occupant support of clause 7, any other clause, or combination of clauses, wherein the bias unit includes first, second, and third collapsible hinges arranged on a first top edge of the front platform and a first top edge of the rear platform and fourth, fifth, and sixth collapsible hinges arranged on a first bottom edge of the front platform and a second bottom edge of the rear platform, the first, second, third, fourth, fifth, and sixth collapsible hinges configured to collapse inwardly when the reactive-occupant positioner moves from the pre-event configuration to the event configuration.

Clause 34. The occupant support of clause 7, any other clause, or combination of clauses, wherein the bias unit includes first, second, third, and fourth rectangular flat springs arranged between the front platform and the rear platform, the first, second, third, and fourth flat springs configured to compress inwardly to allow the front platform to move toward the rear platform when the reactive-occupant positioner moves from the pre-event configuration to the event configuration.

Clause 35. The occupant support of clause 7, any other clause, or combination of clauses, wherein the bias unit includes first and second semi-circular flat springs arranged between the front platform and the rear platform, wherein a first and second end of each of the first and second flat springs attached to the front platform and a midpoint of each of the first and second flat springs attached to the rear platform, and each of the first and second flat springs is configured to compress inwardly to allow the front platform to move toward the rear platform when the reactive-occupant positioner moves from the pre-event configuration to the event configuration.

The invention claimed is:

1. An occupant support comprising:
a seat bottom,
a seat back coupled to the seat bottom and arranged to extend upwardly away from the seat bottom, the seat back including a headrest and a backrest located between the headrest and the seat bottom, and
a reactive-occupant positioner coupled to the seat back to move therewith and configured to arrange an occupant on the occupant support in response to an impact event so that the occupant moves from:
 a pre-event arrangement in which a torso of the occupant is arranged a first distance from a frame of the seat back,
 to an event arrangement in which the torso of the occupant is arranged a second distance from the frame that is less than the first distance, and
 to a post-event arrangement in which the torso of the occupant is arranged a third distance from the frame that is greater than the second distance after the impact event is complete without repair of the reactive-occupant positioner,
wherein, in response to the impact event, the reactive-occupant positioner changes from a pre-event configuration in which the reactive-occupant positioner causes the occupant to be in the pre-event arrangement, to an event configuration in which the reactive-occupant positioner causes the occupant to be in the event arrangement,
wherein the reactive-occupant positioner includes a rear platform coupled to the seat back to move therewith and a front platform movable relative to the rear platform,
wherein, in the pre-event configuration, the reactive-occupant positioner has a first thickness defined between the front platform and the rear platform, in the event configuration, the reactive-occupant positioner has a second thickness defined between the front platform and the rear platform that is less than the first thickness, and, in the post-event configuration, the reactive-occupant positioner has a third thickness defined between the front platform and the rear platform that is greater than the second thickness,
wherein the reactive-occupant positioner further includes a bias unit coupled to the front platform and to the rear platform and configured to bias the front platform away from the rear platform toward the pre-event configuration of the reactive-occupant positioner prior to application of the impact force and toward the post-impact configuration of the reactive-occupant positioner after application of the impact force to the occupant support, and
wherein the reactive-occupant positioner further includes a first arm linkage and a second arm linkage, the first arm linkage pivotably coupled to a first top edge of the front platform and a second top edge of the rear platform, and the second arm linkage pivotably coupled to a first bottom edge of the front platform and a second bottom edge of the rear platform.

2. The occupant support of claim 1, wherein, when the reactive-occupant positioner moves from the pre-event configuration to the event configuration, the first arm linkage and the second arm linkage pivot upwardly and toward the rear platform such that a biasing force of the bias unit increases.

3. The occupant support of claim 2, wherein, when the reactive-occupant position moves from the event configuration to the post-event configuration, the first arm linkage and the second arm linkage pivot downwardly and away from the rear platform such that the biasing force of the bias unit decreases.

4. The occupant support of claim 1, wherein the bias unit includes a first coupling member, a second coupling member, and a first biasing member, the first coupling member arranged on a first end of the first biasing member and coupled to a top portion of the front platform, and the second coupling member arranged on a second end of the first biasing member and coupled to a bottom portion of the rear platform.

5. The occupant support of claim 4, wherein the first biasing member is a spring.

6. The occupant support of claim 4, wherein the bias unit further includes a third coupling member, a fourth coupling member, and a second biasing member, the third coupling member arranged on a first end of the second biasing member and coupled to the top portion of the front platform, and the fourth coupling member arranged on a second end of the second biasing member and coupled to the bottom portion of the rear platform.

7. The occupant support of claim 6, wherein the first arm linkage is pivotably coupled to the first top edge of the front platform via a first hinge and to the second top edge of the rear platform via a second hinge, and the second arm linkage is pivotably coupled to the first bottom edge of the front platform via a third hinge and to the second bottom edge of the rear platform via a fourth hinge.

8. The occupant support of claim 7, wherein the front platform includes a front main portion and the rear platform includes a rear main portion, and wherein the front main portion and the rear main portion each have a first opening configured to accommodate the first biasing member when the reactive-occupant positioner is moved to the event configuration and is in the event configuration, and a second opening configured to accommodate the second biasing member when the reactive-occupant positioner is moved to the event configuration and is in the event configuration.

9. The occupant support of claim 8, wherein the first arm linkage and the second arm linkage each have a third opening configured to accommodate the first biasing member when the reactive-occupant positioner is moved to the event configuration and is in the event configuration, and a fourth opening configured to accommodate the second biasing member when the reactive-occupant positioner is moved to the event configuration and is in the event configuration.

10. The occupant support of claim 9, wherein each of the front platform, the rear platform, the first arm linkage, and the second arm linkage includes a first opening cover and a second opening cover that are arranged to cover a majority of each of the first, second, third, and fourth openings.

11. The occupant support of claim 10, wherein the first coupling member and the third coupling member each include a hook member that extends through a respective portion of the third opening and the fourth opening of the first arm linkage not covered by the first and second opening covers of the first arm linkage, and wherein the second coupling member and the fourth coupling member each include a hook member that extends through a respective portion of the first opening and the second opening of the rear surface platform not covered by the first and second opening covers of the rear surface platform.

12. The occupant support of claim 11, wherein the front platform defines a first plane and further includes a first wing and a second wing that each extend outwardly away from the front main portion of the front platform in the first plane, and the rear platform defines a second plane and further includes a third wing and a fourth wing that each extend away from the rear main portion in the second plane.

13. The occupant support of claim 1, wherein the backrest includes a backrest cushion configured to engage and support the torso of the occupant and located in spaced-apart relation to the frame, and the front platform is arranged adjacent to the backrest cushion between the rear platform and the backrest cushion.

14. The occupant support of claim 13, wherein, in response to the impact event, the torso of the occupant pushes on the backrest cushion which in turn pushes on the front platform so as to move the front platform toward the rear platform such that the reactive-occupant positioner moves from the pre-event configuration to the post-event configuration.

15. The occupant support of claim 1, wherein the first distance is about equal to the third distance.

* * * * *